United States Patent [19]

Lyon

[11] Patent Number: 4,763,942

[45] Date of Patent: Aug. 16, 1988

[54] GAMBREL

[76] Inventor: Jesse J. Lyon, R.F.D. #1, Orleans, Utah 05860

[21] Appl. No.: 9,880

[22] Filed: Feb. 2, 1987

[51] Int. Cl.⁴ ............................................... A22B 5/00
[52] U.S. Cl. ........................................ 294/79; 17/44.2
[58] Field of Search ..................... 294/79; 17/44, 44.1, 17/44.2, 44.3, 44.4

[56] References Cited

U.S. PATENT DOCUMENTS

| | | | |
|---|---|---|---|
| 458,018 | 8/1891 | Curtis | 294/79 |
| 1,020,843 | 3/1912 | Petersen | 294/79 |
| 1,148,393 | 7/1915 | McGrath | 294/79 |
| 3,188,130 | 6/1965 | Pietrowicz | 294/79 |

Primary Examiner—James B. Marbert
Attorney, Agent, or Firm—Gilden & Israel

[57] ABSTRACT

A game holding gambrel is formed from a pair of plastic tubes attachable together by the use of a threaded coupling. Loops are provided at opposed ends of the assembled tubes with these loops being designed to receive the feet of the animal to be butchered. A plastic chain extends upwardly from the ends of the tube assembly and is attachable to a tree limb, or the like, so that the animal can be held in a suspended position. The gambrel may be disassembled into a compact package for storage and transportation.

1 Claim, 2 Drawing Sheets

GAMBREL

BACKGROUND OF THE INVENTION

1. Field of the Invention

The present invention relates to gambrels, and more particularly pertains to a new and improved gambrel construction which is of a lightweight and collapsible design.

2. Description of the Prior Art

The use of animal supporting gambrels is known in the prior art. More particularly, Gambrels are used to hang an animal in a suspended position to facilitate skinning, butchering, and the like. A good example of a prior art gambrel is to be found in U.S. Pat. No. 1,030,683, which issued to R. Roskopf on June 25, 1912. The Roskopf device is of a telescoping design and includes hooks at opposed end of the telescoping member. A centrally positioned hook is utilized to hand the gambrel in a desired location, with the end hooks then being utilized to hang the animal thereon.

A more modern gambrel design is to be found in U.S. Pat. No. 3,137,030, which issued to F. J. Varner on June 16, 1964. The gambrel shown in this patent includes means for alternatively holding the animal by its feet or by its head, and is substantially more complex in construction than the above-discussed Roskopf device. Further, the Varner gambrel provides no means for adjusting the width of the leg holding members associated therewith.

As can be appreciated, both of the above-discussed gambrels are functional for their intended use. They are representative of a far larger number of patents which have issued regarding game holding devices, with minor patentable differences being obvious in each of the prior art patents. While numerous gambrel designs are available, none of the prior art gambrel devices are of a lightweight, collapsible design which would facilitate their storage and carrying by a hunter in the woods. As such, it could be appreciated that there is a continuing need for new and improved gambrel designs which would facilitate their use by a hunter in the field without undue burden, and in this respect, the present invention substantially fulfills this need.

SUMMARY OF THE INVENTION

In view of the foregoing disadvantages inherent in the known types of gambrels now present in the prior art, the present invention provides an improved gambrel construction wherein the same is formed of a lightweight plastic tubing which may be disassembled to facilitate its carrying and use by a hunter in the woods. As such, the general purpose of the present invention, which will be described subsequently in greater detail, is to provide a new and improved gambrel which has all the advantages of the prior art gambrels and none of the disadvantages.

To attain this, the present invention comprises a gambrel construction consisting of a pair of axially alignable plastic tubing members which may be joined together by a threadably attached coupling when desired. In its assembled form, the tubing includes nylon rope loops at opposed ends thereof, with these loops serving to receive the feet of an animal to be skinned or butchered. A plastic chain is attached to each of the rope loops, and is extendable upwardly for attachment around a tree limb or some similar supporting structure. The plastic chain includes a metal hook on its free end, with this hook then being engagable with a chain link to thus adjust the height of the gambrel above the ground.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gambrel which has all the advantages of the prior art gambrels and none of the disadvantages.

It is another object of the present invention to provide a new and improved gambrel which may be easily and efficiently manufactured and marketed.

It is a further object of the present invention to provide a new and improved gambrel which is of a durable and reliable construction.

An even further object of the present invention is to provide a new and improved gambrel which is susceptible of a low cost of manufacture with regard to both materials and labor, and which accordingly is then susceptible of low prices of sale to the consuming public, thereby making such gambrels economically available to the buying public.

Still yet another object of the present invention is to provide a new and improved gambrel which provides in the apparatuses and methods of the prior art some of the advantages thereof, while simultaneously overcoming some of the disadvantages normally associated therewith.

Still yet another object of the present invention is to provide a new and improved gambrel which is of a lightweight, collapsible construction.

Yet another object of the present invention is to provide a new and improved gambrel which is particularly well adapted for carrying and use by a hunter in the woods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
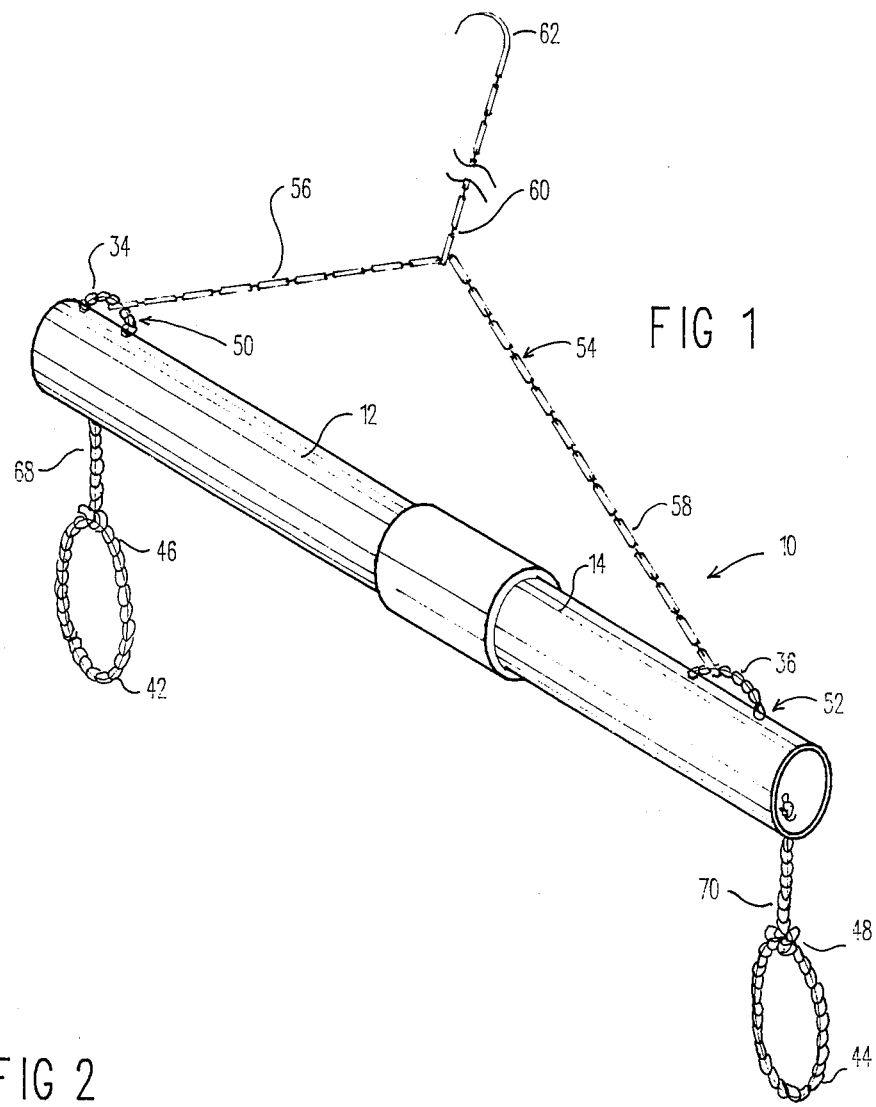
FIG. 1 is a perspective view of the gambrel forming the present invention.
Figure 2:
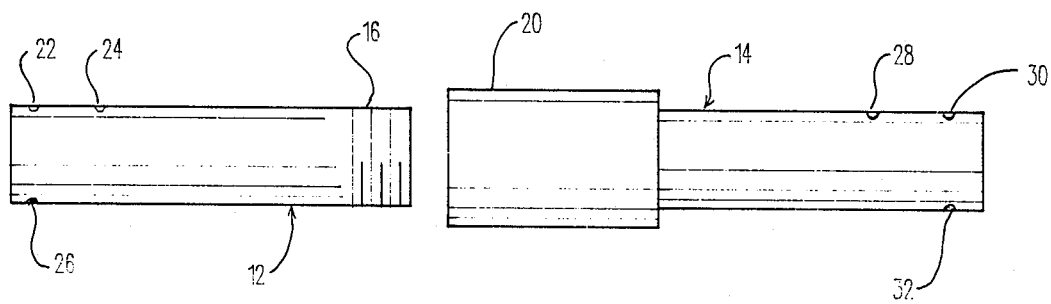
FIG. 2 is an exploded view of the gambrel's tubing section.
Figure 3:
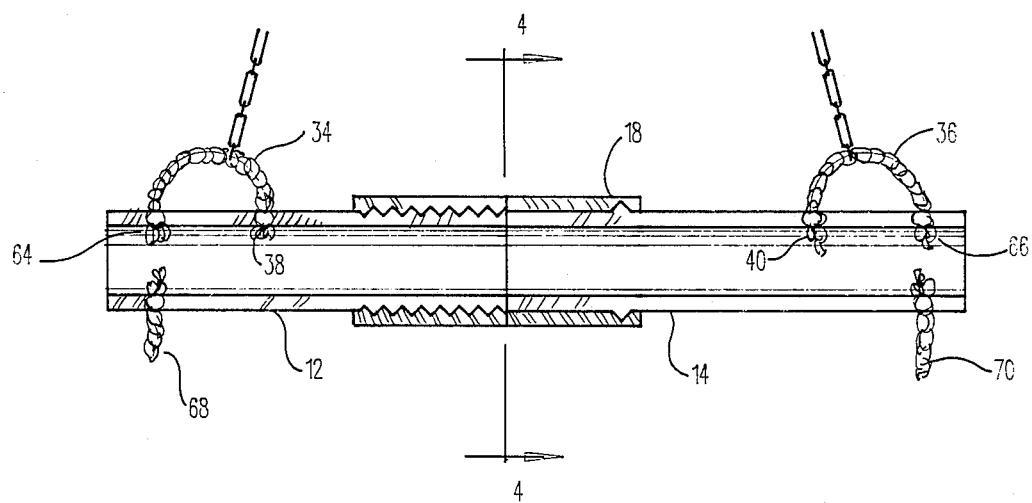
FIG. 3 is a cross-sectional front elevation view.
Figure 4:
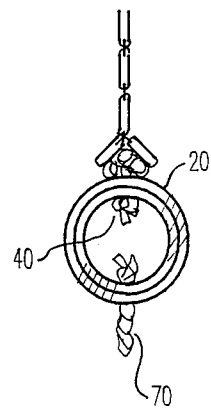
FIG. 4 is a cross-sectional view of the invention taken along the line 4—4 in FIG. 3.

With reference now to the drawings, and in particular to FIGS. 1-4 thereof, a new and improved gambrel embodying the principles and concepts of the present invention and generally designated by the reference numeral 10 will be described.

More specifically, it will be noted that the gambrel 10 essentially comprises two separate tubing sections 12, 14 which would desirably be formed on a plastic material, such as PVC or the like. A first end of the tubing member 12 may be provided with threads 16, and one free end of the tubing member 14 may be provided with a flared swivel connection 18. An internally threaded plastic coupling 20 may then be utilized to connect these two members 12, 14 in axially fixed alignment to form the basic structure of the gambrel 10. A remaining free end of the tubing section 12 is provided with two aligned apertures 22, 24 on one circumferential surface thereof with a further through-extending aperture 26 being provided on an opposed circumferential surface. Similarly, the tubing section 14 is provided with axially aligned apertures 28, 30 on one circumferential surface of the remaining free end thereof, with an opposed aperture 32 being also provided. A first length of nylon cord 34 may be attached to the tubing member 12 in the manner best illustrated in FIG. 3, and a second length of nylon cord 36 may be similarly attached to the tubing member 14. More specifically, the nylon rope 34 may be directed through the apertures 22, 24 and then be knotted at its respective ends 38, 64. By the same token, the rope 36 may have a knotted end 40 positioned in aperture 28 with a further knotted end 66 being retained in the aperture 30. The ends of the ropes 68, 70 may then be directed from respective apertures 26, 32 and formed into respective loops 42, 44. The loop 42 is formed from a metal ring 46 attached to the end of the rope 68, with this ring being slidably positionable along the length of the rope. A similar metal ring 48 is slidably positionable along the rope 70 in the manner illustrated so as to form the loop 44.

The above-described manner of attaching the ropes 34, 36 to the respective pipe sections 12, 14 result in the formation of further respective loops 50, 52. These further loops 50, 52 facilitate the attachment of a plastic chain 54 to the gambrel 10. The chain 54 includes a first section 56 connected to the loop 50, and a second section 58 connected to the loop 52. The chain sections 56, 58 are joined together at the attachment point of a third chain section 60 having a metallic hook 62 attached to a remaining free end thereof.

With respect to the manner of usage and operation of the present invention, it can be appreciated that the gambrel 10 can be carried in a collapsed form within a hunter's backpack or the like. When it is desired to skin and butcher an animal, such as a rabbit, the pipe sections 12, 14 may be threadably attached together by means of the coupling 20 so as to form the gambrel 10 as best illustrated in FIG. 1. The plastic chain section 60 is of a substantial length to facilitate its positioning over a support member, such as a tree limb, with the metal hook 62 then being engagable with one of the chain links so as to position the gambrel at a desired height above the ground. The animal's feet may then be positioned in the respective loops 42, 44, and these loops can be adjustably tightened by the respective sliding of the metal rings 46, 48 along the ropes 68, 70. As such, the animal to be butchered is securely attached to the gambrel and is supported at a desired height above the ground.

With respect to the above description then, it is to realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gambrel, comprising:
   a. tubular support means, said tubular support means comprising first and second axially alignable tubular members, said support means further comprising a threaded coupler means, said coupler means having a hollow cylindrical construction, said first and second tubular members being threadably attachable to said coupler means;
   b. animal holding means comprising first and second loops formed from a flexible material, said first and second loops being adjustable in size to thus fixedly secure said animal thereto, said first and second loops extending downwardly from said tubular support means; and
   c. gambrel support means whereby said tubular support means may be attached to an upwardly positioned support member, said gambrel support means comprising third and fourth loops formed from said flexible material and extending upwardly from said tubular support means, said gambrel support means further comprising a first and second chain, said first chain having a first end attached to said third loop, said first chain having a second end attached to said fourth loop, said second chain having a first end attached to a central portion of said first chain, said second chain having a second end attached to a hook, said second chain having sufficient length to allow a looping thereof around said upwardly positioned support member, said hook being engageable with a selected link of said second chain, thereby to provide for height adjustment of said tubular support means above a ground surface when said second chain is looped around said upwardly positioned support member.

* * * * *